United States Patent [19]

Abrams

[11] Patent Number: 4,764,187
[45] Date of Patent: Aug. 16, 1988

[54] REGENERATING DYNAMIC ADSORBER SYSTEM AND METHOD FOR CONTAMINANT REMOVAL

[75] Inventor: Richard F. Abrams, Westboro, Mass.

[73] Assignee: RAd Systems, Inc., Westboro, Mass.

[21] Appl. No.: 12,300

[22] Filed: Feb. 9, 1987

[51] Int. Cl.$^4$ .............................................. B01D 53/04
[52] U.S. Cl. ............................................ 55/20; 55/21; 55/60; 55/66; 55/77; 55/162; 55/179; 55/390
[58] Field of Search ................... 55/18, 34, 60, 62, 66, 55/68, 74, 75, 77, 78, 97, 162, 179–181, 387, 389, 390, 20, 21

[56] References Cited

U.S. PATENT DOCUMENTS

| 2,248,225 | 7/1941 | Fonda | 55/162 |
| 2,359,660 | 10/1944 | Martin et al. | 55/62 X |
| 2,639,000 | 5/1953 | Edwards | 55/179 |
| 2,993,563 | 7/1961 | Munters et al. | 55/62 X |
| 3,182,435 | 5/1965 | Axt | 55/162 |
| 3,242,651 | 3/1966 | Arnoldi | 55/62 X |
| 3,263,400 | 8/1966 | Hoke et al. | 55/62 X |
| 3,274,751 | 9/1966 | Skarstrom | 55/179 X |
| 3,534,529 | 10/1970 | Mattia | 55/62 |
| 3,606,760 | 9/1971 | Howell | 55/97 X |
| 3,791,107 | 2/1974 | Gustavsson | 55/179 |
| 3,853,501 | 12/1974 | Stringer | 55/DIG. 9 |
| 3,890,121 | 6/1975 | Thomas | 55/66 X |
| 3,940,471 | 2/1976 | Favre | 55/66 X |
| 4,144,037 | 3/1979 | Armond et al. | 55/62 X |
| 4,452,612 | 6/1984 | Mattia | 55/181 X |

FOREIGN PATENT DOCUMENTS

1211101 11/1970 United Kingdom ................ 55/179

Primary Examiner—Robert Spitzer
Attorney, Agent, or Firm—Joseph S. Iandiorio; Douglas E. Denninger

[57] ABSTRACT

A dynamic adsorber system and method for removing a contaminant from fluid by feeding contaminated fluid to be cleansed to an adsorption bed, having a capacity for the contaminant based substantially on the flow rate of the contaminated fluid, to cleanse the fluid, and subsequently regenerating that bed by providing clean fluid relatively free of the contaminant to flush that bed with the clean fluid.

40 Claims, 4 Drawing Sheets

Fig. 1

_Fig. 2B_

_Fig. 2A_

_Fig. 3B_

_Fig. 3A_

REGENERATING DYNAMIC ADSORBER SYSTEM AND METHOD FOR CONTAMINANT REMOVAL

FIELD OF INVENTION

This invention relates to a dynamic adsorber for removing radon and other contaminants from a fluid, and more particularly to such a dynamic adsorber having one or more adsorption beds which are periodically flushed with clean fluid to regenerate the beds without heating.

BACKGROUND OF INVENTION

There are a number of applications in which it is desirable to remove contaminants from a fluid such as air. Radon accumulation in homes, schools and other buildings is recognized as a serious health problem. Radon is a radioactive noble gas produced in the ground by the natural decay of uranium and radium. The radon decays to a chain of daughter products which associate with dust particles in the air. The daughter products emit harmful alpha radiation which, when inhaled, damages lung tissue. Tens of thousands of cases of lung cancer are estimated to arise each year from radon infiltration into homes.

Radon adsorption on activated charcoal has been utilized to remove radon from uranium mines. Through a cycling adsorption process radon is collected within a charcoal bed and then removed for disposal. As is true of other cycling adsorption processes commonly used to remove contaminants from a gas stream, the goal of the process is to concentrate the contaminant to facilitate disposal of the contaminant. Consequently, the charcoal bed once contaminated is cleansed by passing gas at a lower rate through the bed to produce a regeneration gas stream which has a higher contaminate concentration than the initial contaminated air. However, the radon concentration of the charcoal bed can be lowered only to the concentration level of the regeneration gas stream which is obtained from the contaminated mine and is usually heavily contaminated. Since the adsorption of radon varies inversely with temperature, the beds are typically heated during regeneration to enhance release of the radon and prevent readsorption of the radon in the regeneration gas. Heating also reduces the flow of regeneration gas required to cleanse the charcoal bed. Dual charcoal beds are operated simultaneously so that one removes contaminants while the other is regenerated. Additional charcoal beds are sometimes provided to further concentrate the regenerative gas stream.

There are several problems with this cycling adsorption technique, particularly when applied to use in homes. A great deal of energy is required to heat the beds during regeneration. During the winter the cost of heating the bed during regeneration would be compounded by the loss of indoor heated air utilized as a regeneration gas to be vented outdoors.

SUMMARY OF INVENTION

It is therefore an object of this invention to provide an improved system and method for removing contaminants from a fluid using regenerable adsorption beds.

It is a further object of this invention to provide such a system and method which regenerate the adsorption beds efficiently and without requiring heating of the beds.

It is a further object of this invention to provide such a system and method which do not rely on contaminated fluid to regenerate the beds.

Yet another object of this invention is to provide such a system and method for removing radon from buildings which minimizes heat loss due to loss of heated indoor air during cleansing of the air.

A still further object of this invention is to provide such a system and method which can use passively operated valves to provide reliable and inexpensive operation.

This invention results from the realization that truly effective removal of radon, and other contaminants at a concentration sufficiently low so that the dynamic adsorption capacity of an adsorption bed is dependent primarily on the flow rate of the carrier gas, from a home can be achieved by feeding the contaminated indoor air to the bed and then cleansing the bed utilizing essentially contaminant-free outdoor air at a flow rate which, based on the relative temperatures of the indoor air and the outdoor air, is sufficient to regenerate contaminated beds without heating, and by releasing the contaminated regeneration air to the outdoors.

This invention features a dynamic adsorber system for removing a contaminant from fluid, including first and second adsorption beds each having a capacity for the contaminant based substantially on the flow rate of the contaminated fluid, means for feeding contaminated fluid to be cleansed to one of the beds and for issuing cleansed fluid, and means for providing clean fluid relatively free of the contaminant to the other of the beds to flush it with the clean fluid and for issuing contaminated fluid. The system further includes control means for connecting the means for feeding alternately to the first and second beds to remove the contaminant from the fluid, and for connecting the means for providing to the bed not connected to the means for feeding to regenerate that bed before it is reconnected to the means for feeding.

In one embodiment, the means for providing obtains outdoor air as the clean fluid and returns the issued contaminated air outdoors. The means for feeding obtains indoor air as the contaminated fluid and returns clean air indoors. The control means includes timer means for establishing successive time periods to determine when each bed is to be alternately connected to one of the means for feeding and the means for providing to accomplish cleansing with or regeneration of that bed, respectively.

In another embodiment, the means for feeding includes first fan means for driving the fluid to be cleansed through the first bed, and second fan means for driving the fluid to be cleansed through the second bed, and the means for providing includes first regenerating fan means for driving the clean fluid through the first bed and second regenerating fan means for driving the clean fluid through the second bed. The control means includes timer means for activating the first fan means and the second regenerating fan means during one time period and activating the second feed fan means and the first regenerating fan means during another time period to alternately cleanse with one bed while regenerating the other bed. The control means further includes valve means for connecting and disconnecting each bed relative to the means for feeding and the means for providing to accomplish cleansing with or regeneration of that bed, respectively. The valve means may be actuated by changes in fluid pressure induced by the fan means when activated.

In yet another embodiment, the control means includes drive means for relocating the first and second beds relative to the means for feeding and the means for providing to alternately cleanse with and regenerate each bed. The first and second beds may be separate portions of a single, rotatable structure and the control means further includes timer means for periodically activating the drive means. The bed may include activated charcoal, and the contaminant may be a noble gas such as radon.

In a still further embodiment, the means for feeding supplies the contaminated fluid at a first flow rate and the means for providing provides the contaminated fluid at a second flow rate. The second flow rate may vary inversely and exponentially to the difference in absolute temperatures of the contaminated fluid and the clean fluid, the temperature of the contaminated fluid being a preselected high temperature and the temperature of the clean fluid being a preselected low temperature. Alternatively, the second flow rate is greater than the first flow rate. Yet again, the second flow rate may be a function of the temperature of the clean fluid and the rate at which the bed connected to the means for feeding becomes saturated with the contaminant, the temperature of the clean fluid being a preselected low temperature for the clean fluid.

In yet a still further embodiment, the first and second beds are each enclosed in a housing having a first plenum associated with feed fan means and a second plenum associated with regenerating fan means, the first and second plenums developing pressure differentials opposite from each other which reverse at the end of each time period when fan activation changes. The control means may further include opposing flapper valve means disposed in each plenum and operated by changes in pressure for alternately connecting the plenum to one of the means for feeding and the means for providing and disconnecting that plenum from the other as the pressure differentials reverse.

This invention also features a method of dynamic adsorption for removing a contaminant from a fluid, including feeding contaminated fluid to be cleansed from a first volume to an adsorption bed and returning cleansed fluid to the first volume. The method further includes subsequently regenerating that bed by providing clean fluid relatively free of the contaminant from a second volume to the bed to flush it with the clean fluid.

In one embodiment, the method further includes repeatedly and alternately feeding and regenerating the bed to cleanse the contaminant from the first volume, and regenerating includes returning contaminated air to the second volume. The method may further include simultaneously regenerating a second adsorption bed while feeding the other bed, and subsequently feeding the second bed while regenerating the other bed to provide continuous cleansing of fluid from the first volume.

This invention also features a method of dynamic adsorption for removing a contaminant, including feeding at a first flow rate fluid to be cleansed from a first volume to a first adsorption bed for the contaminant, and simultaneously regenerating a second adsorption bed by providing at a second flow rate clean fluid, relatively free of the contaminant, from a second volume to the bed to flush it with the clean fluid. The method further includes subsequently feeding at the first flow rate contaminated fluid to the second bed while regenerating at the second flow rate the first bed to provide continuous cleansing of fluid from the first volume. The second flow rate varies inversely to the difference in absolute temperatures of the contaminated fluid and the clean fluid. Alternatively, the second flow rate is a function of the temperature of the clean fluid and the rate at which the bed receiving contaminated fluid becomes saturated.

DISCLOSURE OF PREFERRED EMBODIMENT

Other objects, features and advantages will occur from the following description of a preferred embodiment and the accompanying drawings, in which.

This invention may be accomplished by feeding a contaminated fluid such as indoor air to an adsorption bed and returning cleansed air to the indoors, and later regenerating that bed by providing a clean fluid such as outdoor air to the bed at a flow rate which, based on the relative temperatures of the indoor air and the outdoor air, is sufficient to flush the bed with the clean air. The regeneration air once contaminated is vented outdoors.

In one construction, a dynamic adsorber system according to this invention includes two charcoal beds, one of which cleanses indoor air while the other is regenerated. In another construction, a single rotatable bed is divided into two beds which alternately cleanse the air and are regenerated. In yet another construction, particularly where the air to be cleansed contains low levels of contaminants, a single bed is alternately saturated and cleansed. Fluid other than air can be cleansed according to this invention, such as by removing trace organics from water. Further, adsorption beds containing adsorbents such as activated alumina or molecular sieves may be used instead of activated charcoal.

Figure 1:
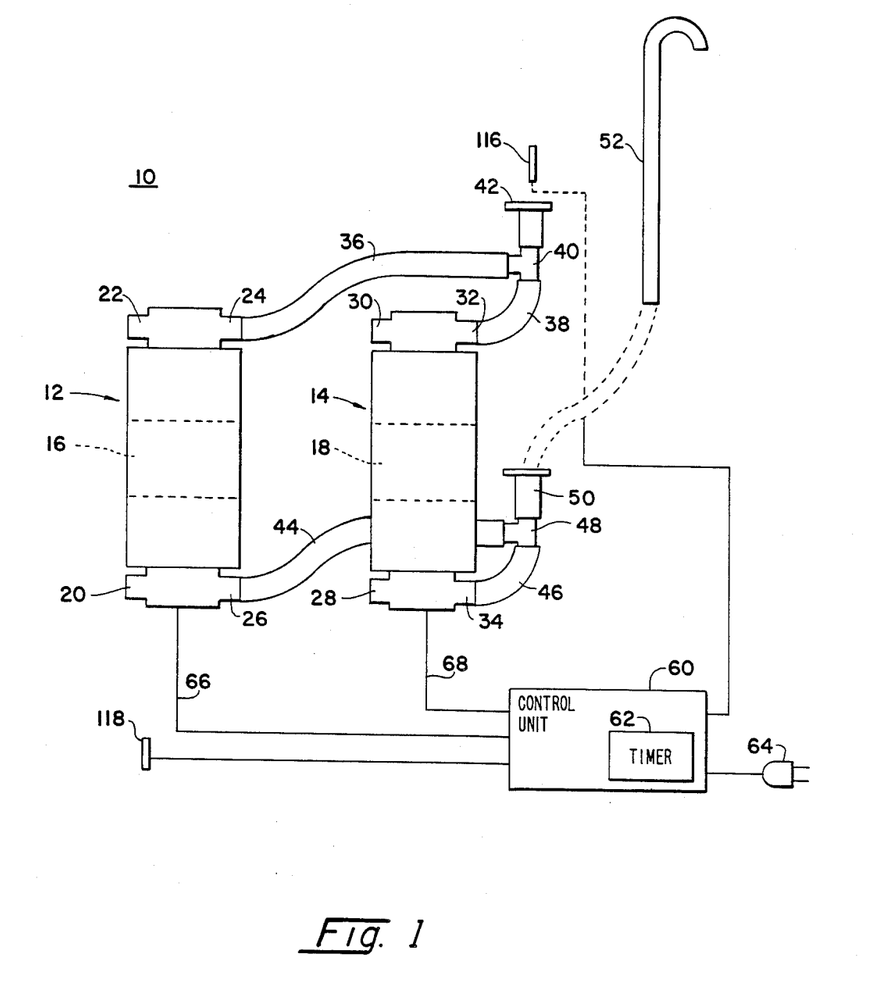
FIG. 1 is a schematic diagram of a regenerating dynamic adsorber system according to this invention utilizing dual charcoal cannisters.

Dynamic adsorber system 10, FIG. 1, is suitable for use in a home or other building and includes cannisters 12, 14 each containing adsorption beds 16, 18, respectively. Cannister 12 has feed inlet 20 and feed outlet 22 for obtaining contaminated air to be cleansed and returning cleansed air during a cleansing mode. Cannister 12 also contains regenerating inlet 24 and regenerating outlet 26 through which clean, outdoor air relatively free of radon enters cannister 12 during a regeneration mode to flush bed 16 with the clean air and issue contaminated air which is returned outdoors. Similarly, cannister 14 carries feed inlet 28, feed outlet 30, regenerating inlet 32, and regenerating outlet 34. Ducts 36, 38 are connected by T-coupler 40 to duct 42 which passes through the wall of the building to obtain outdoor air.

Conventional 4" diameter dryer hose is acceptable for ducts 36, 38, 42. Exhaust ducts 44, 46 are connected through T-coupler 48 to duct 50 which carries contaminated air used for regeneration to exhaust pipe 52, e.g., a snorkle projecting eight to ten feet above the ground outdoors.

The operation of cannisters 12, 14 is controlled by control unit 60 having timer 62. Power is obtained through plug 64 and is passed through lines 66, 68 to fans within cannisters 12, 14 to alternately establish regeneration and cleansing modes for each cannister.

Figure 2A:
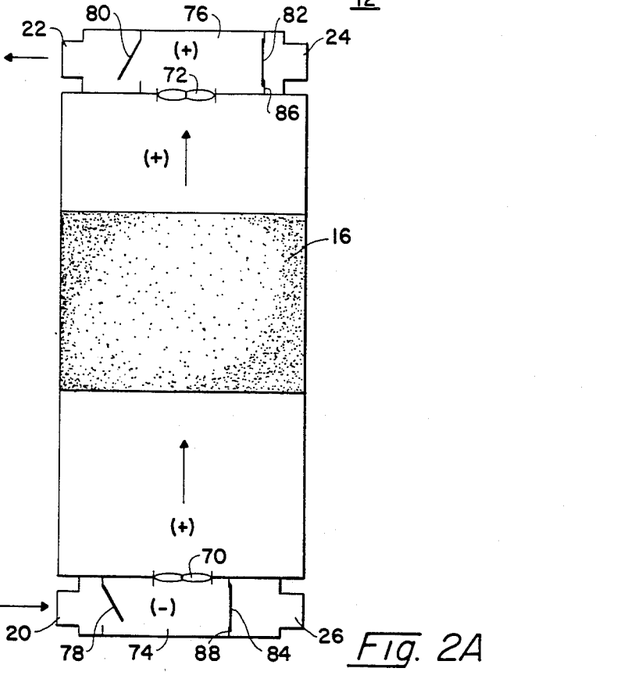
FIG. 2A is a schematic cross-sectional view of one of the cannisters during the cleansing mode.

Cannister 12 is shown in cross-section, FIG. 2A, to reveal feed fan 70 and regenerating fan 72 associated with plenums 74, 76, respectively. During the cleansing mode, a negative pressure differential is established in plenum 74 and a positive pressure differential is established in plenum 76 to open passive feed flapper valves 78, 80 while closing regenerating flapper valves 82, 84 by forcing valve 82 against stop 86 and drawing flap 84 against stop 88. In other constructions the control valves are arranged to permit forward-flushing during regeneration instead of back-flushing.

Figure 2B:
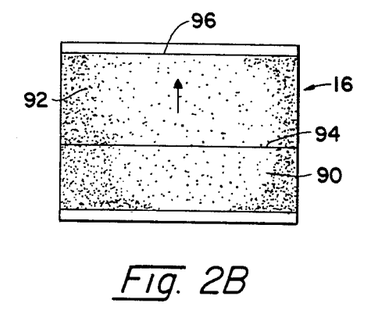
FIG. 2B is a schematic diagram showing the saturation of the charcoal bed after one-half of a cycle.

An acceptable dimension of cannister 12 for home use is 32" high while charcoal bed 16 is 18" square. An acceptable cycle time is 30 minutes. Charcoal bed 16 is shown in FIG. 2B after 15 minutes in the cleansing mode having saturated charcoal 90 separated from unsaturated charcoal 92 by mass transfer zone 94. At the end of 30 minutes, mass transfer zone 94 approaches upper boundary 96.

The cycle time is selected to prevent breakthrough of mass transfer zone 94 past upper boundary 96. The breakthrough time depends on the rate of airflow, velocity of air through bed 16, type of charcoal, relative humidity, the volume of bed 16, and the temperature of the airflow and bed 16.

The flow rate of the regenerating air is typically selected as follows. The maximum expected temperature of the indoor air is selected, e.g. 70° F., and a time period is determined by estimating the progression rate of the mass transfer zone for the bed in the cleansing mode. Once this time period is established, a flow rate for the regeneration air is selected which will cleanse the bed in the regenerating mode before the mass transfer zone reaches the end of the bed in the cleansing mode, that is, before that bed becomes completely saturated. The flow rate of the regenerating air is selected based on the expected low temperature of the outdoor air.

Figures 3A, 3B:
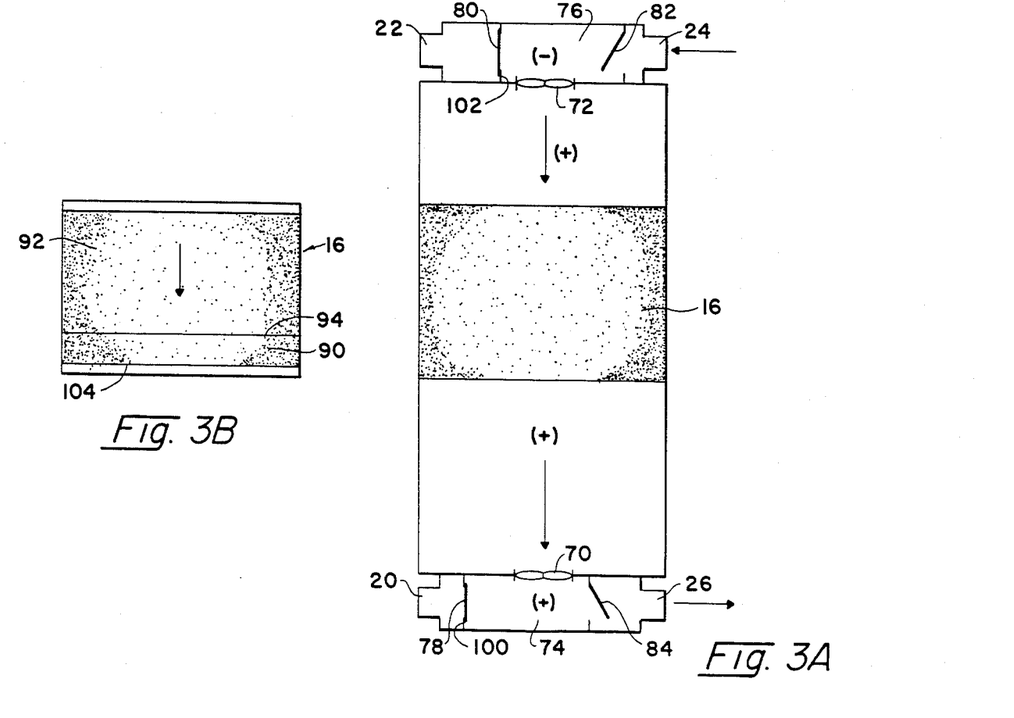
FIG. 3A is a cross-sectional view of the cannister during regeneration mode.
FIG. 3B is a schematic diagram of the charcoal bed halfway through the cycle.

At the end of the cycle the cleansing mode is ended and the regenerating mode begun. As shown in FIG. 3A, fan 70 is switched off and fan 72 is switched on to develop a negative pressure in plenum 76 and a positive pressure in plenum 74. Feed valve 78 is forced against stop 100 while feed valve 80 is drawn against stop 102. Simultaneously, regenerating valve 82 is drawn open and valve 84 is forced open to draw clean air through inlet 24 and pass contaminated regenerating air through outlet 26. Fan 72 typically has a higher capacity than fan 70 and typically drives air at a higher flow through bed 16. Alternatively, a single reversing fan having two different rotational speeds replaces fans 70, 72. As shown in FIG. 3B, after one-half of a cycle, e.g., 15 minutes, more than half of charcoal bed 16 is unsaturated charcoal 92. Mass transfer zone 94 meets lower threshold 104 in twenty to twenty-five minutes, well before bed 18 of cannister 14 becomes saturated.

Figure 4:
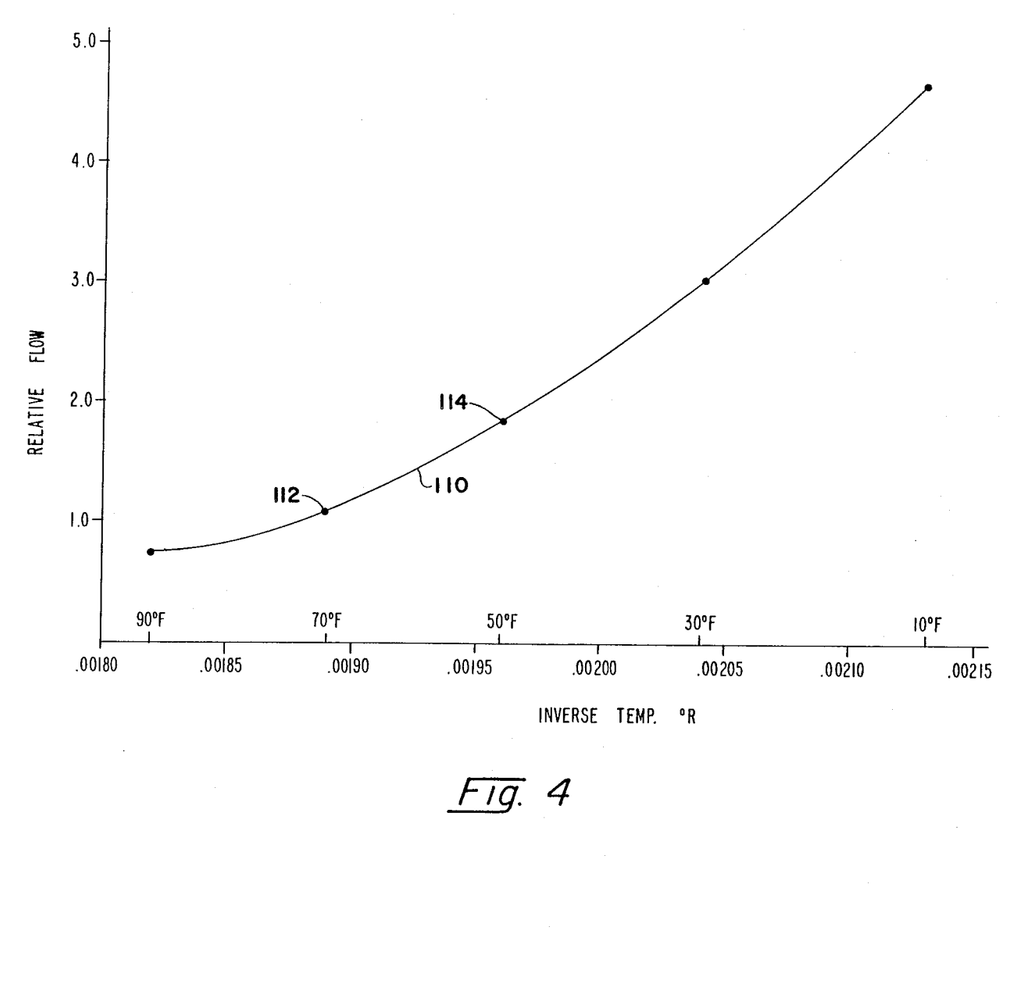
FIG. 4 is a chart showing the relationship of regeneration flow to temperature.

The relationship between the regeneration flow and temperature is shown in FIG. 4 by curve 110. The relative flow is the regeneration flow rate required relative to the flow rate of contaminated air to be cleansed at 70° F. A relative flow of 1.0, shown by point 112, corresponds to a temperature of the regenerating gas stream at approximately 70° F. while twice the flow, represented by point 114, is required to regenerate a charcoal bed in this same period of time when the regenerating gas stream is at 45° F. The 70° F. temperature is a typical maximum operating temperature of the airflow to be cleansed when the beds are located in a basement.

The capacity of the regenerating feed fans is set at a capacity suited to handle most of the lowest temperatures. Actual outdoor temperatures may drop briefly below the minimum selected temperature, but during 95-98% of the year the selected temperature is exceeded. In Massachusetts, for example, the outdoor temperature is at or above 11° for 98% of the year. Further, during the winter the basement temperatures are lower, e.g. 50° F., so the mass transfer zone progresses at a slower rate during cleansing of the indoor air. For example, feed fan 70 has a capacity of 50 cubic feet per minute while regenerating fan 72 has a capacity of 100 cubic feet per minute for a 2000 square foot house. Alternately, a temperature sensor 116, FIG. 1, can be placed outdoors to vary the speed of the regenerating fans according to the temperature of the outdoor air. When the outdoor air is warmer than the indoor air, which is measured by temperature sensor 118, the flow rate of regenerating air can be lower than the flow rate of contaminated air.

Figure 5A:
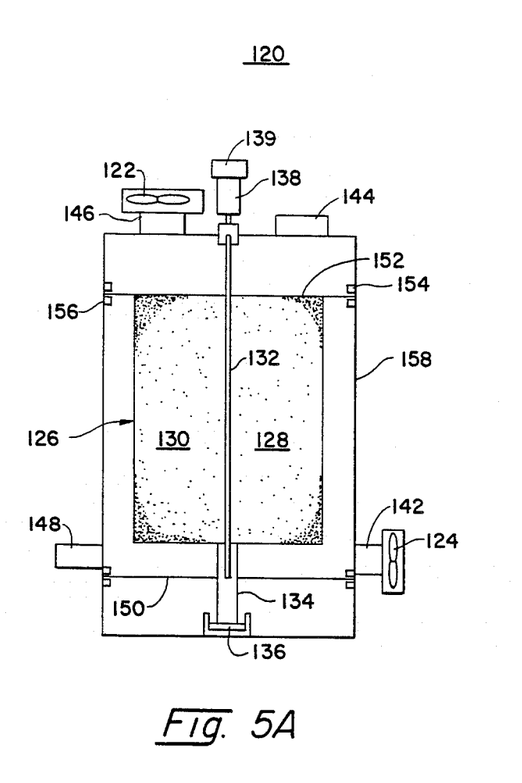
FIG. 5A is a schematic cross-sectional view of an alternative dynamic adsorber system according to this invention.
Figure 5B:
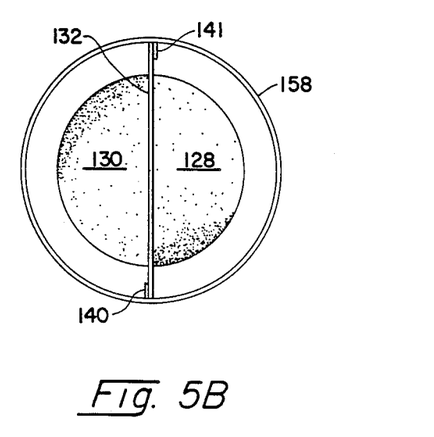
FIG. 5B is a schematic top view of the cannister of FIG. 5A.

In another construction, a single feed fan and a single regenerating fan are utilized. Dynamic adsorber system 120, FIG. 5A, is shown in cross-section having regenerating fan 122 and feed fan 124. Single cylindrical structure 126 is divided into two beds 128, 130 separated by partition 132. Structure 126 is supported by shaft 134 which turns on bearing 136 and is driven by reversing drive motor 138 as controlled by timer 139. As shown in FIG. 5B, during one cycle partition 132 is forced against one side of flanges 138, 140 while during the next cycle the bed is rotated 180° to force partition 132 against the opposite side of flanges 138, 140. Indoor air is driven at a first rate past fan 124, FIG. 5A, through inlet 142, through the bed on that side of system 120, and as cleansed air exits through outlet 144. Similarly, outdoor air is driven past regenerating fan 122 at a second rate of flow through inlet 146 and out through outlet 148. The term driving includes both pushing and drawing the air. The integrity of the feed and regenerating chambers is completed by bottom plate 150, and by sealing plate 152 which seals between the outer edge of bed 126 and housing 158 and turns through plate seals 154, 156. In another construction the beds can be translatable between feed and regenerating chambers.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of dynamic adsorption for removing a contaminant from a fluid comprising:
   feeding contaminated fluid to be cleansed from a first volume to an adsorption bed having a capacity for the contaminant based substantially on the flow of the contaminated fluid and returning cleansed fluid to the first volume; and subsequently regenerating that bed by providing clean fluid relatively free of the contaminant from a second volume to the bed to flush it with the clean fluid, and returning the fluid to the second volume.

2. The method of dynamic adsorption of claim 1 further including repeatedly and alternately feeding and regenerating the bed to cleanse the contaminant from the first volume.

3. The method of dynamic adsorption of claim 1 in which the contaminant is radon.

4. The method of dynamic adsorption of claim 1 in which the fluid is air.

5. The method of dynamic adsorption of claim 1 in which the first volume contains indoor air and the second volume contains outdoor air.

6. The method of dynamic adsorption of claim 1 further including simultaneously regenerating a second adsorption bed while feeding contaminated fluid to the other bed, and subsequently feeding the second bed while regenerating the other bed to provide continuous cleansing of fluid from the first volume.

7. The method of dynamic adsorption of claim 1 in which regenerating includes providing the clean fluid at substantially its ambient temperature.

8. The method of dynamic adsorption system of claim 7 in which regenerating further includes increasing the flow of the clean fluid as its temperature decreases relative to the temperature of the contaminated fluid.

9. The method of dynamic adsorption system of claim 7 in which regenerating further includes providing the clean fluid at a higher flow than that of the contaminated fluid.

10. A method of dynamic adsorption for removing a contaminant from a fluid, comprising:

feeding at a first flow fluid to be cleansed from a first volume to a first adsorption bed having a capacity for the contaminated fluid, the capacity being independent of the concentration of the contaminant in the air, and returning cleansed fluid to the first volume;

simultaneously regenerating a second adsorption bed, having a capacity for the contaminant based substantially on the flow of the contaminated fluid, by providing at a second flow clean fluid, relatively free of the contaminant, from a second volume to the bed to flush it with the clean fluid, and returning the fluid to the second volume; and subsequently feeding at the first flow contaminated fluid to the second bed while regenerating at the second flow the first bed to provide continuous cleansing of fluid from the first volume.

11. The method of claim 10 in which the second flow is a function of the temperature of the clean fluid and the rate at which the bed receiving contaminated fluid becomes saturated.

12. The method of dynamic adsorption system of claim 11 in which regenerating includes providing the clean fluid at substantially its ambient temperature.

13. A method of dynamic adsorption for removing a contaminant from a fluid comprising:

feeding contaminated fluid to be cleansed to an adsorption bed having a capacity for the contaminant based substantially on the flow of the contaminated fluid and returning cleansed fluid; and subsequently regenerating that bed by providing, from a fluid source separate from the contaminated and cleansed fluid, to the bed clean fluid relatively free of the contaminant, at a greater flow than that of the contaminated fluid at least when the temperature of the clean fluid is lower than that of the contaminated fluid, to flush the bed with the clean fluid.

14. A dynamic adsorber system for removing a contaminant from fluid, comprising:

first and second adsorption beds each having a capacity for the contaminant based substantially on the flow of the contaminated fluid;

means for feeding from a first volume contaminated fluid to be cleansed to one of said beds and for issuing cleansed fluid to the first volume;

means for providing from a second volume clean fluid relatively free of the contaminant to the other of said beds to flush it with the clean fluid and for issuing the fluid to the second volume, said means for providing supplying the clean fluid at a greater flow than that of the contaminated fluid at least when the temperature of the clean fluid is lower then that of the contaminated fluid; and control means for connecting said means for feeding alternately to said first and second beds to remove the contaminant from the fluid, and for connecting said means for providing to the bed not connected to said means for feeding to regenerate that bed before it is reconnected to said means for feeding.

15. The dynamic adsorber system of claim 14 in which said means for providing obtains outdoor air as the clean fluid and returns the issued contaminated air outdoors.

16. The dynamic adsorber system of claim 14 in which said means for feeding obtains indoor air as the contaminated fluid and returns the issued cleansed air indoors.

17. The dynamic adsorber system of claim 14 in which said control means includes timer means for establishing successive time periods to determine when each bed is to be alternately connected to one of said means for feeding and said means for providing to accomplish cleansing with or regeneration of that bed, respectively.

18. The dynamic adsorber system of claim 14 in which said means for feeding includes first feed fan means for driving the fluid to be cleansed through said first bed, and second feed fan means for driving the fluid to be cleansed through said second bed.

19. The dynamic adsorber system of claim 18 in which said means for providing includes first regenerating fan means for driving the clean fluid through said first bed, and second regenerating fan means for driving the clean fluid through said second bed.

20. The dynamic adsorber system of claim 19 in which said control means includes timer means for activating said first feed fan means and said second regenerating fan means during one time period and activating said second feed fan means and said first regenerating fan means during another time period to alternately cleanse with one said bed while regenerating the other said bed.

21. The dynamic adsorber system of claim 20 in which said control means further includes valve means for connecting and disconnecting each said bed relative to said means for feeding and said means for providing to accomplish cleansing with or regeneration of the bed, respectively.

22. The dynamic adsorber system of claim 21 in which said valve means are actuated by changes in fluid pressure induced by said fan means when activated.

23. The dynamic adsorber system of claim 14 in which said control means includes drive means for relocating said first and second beds relative to said means for feeding and said means for providing to alternately cleanse with and regenerate each bed.

24. The dynamic adsorber system of claim 23 in which said beds are rotatable relative to said means for feeding and said means for providing.

25. The dynamic adsorber system of claim 23 in which said first and second beds are separate portions of a single, rotatable structure.

26. The dynamic adsorber system of claim 23 in which said control means further includes timer means for periodically activating said drive means.

27. The dynamic adsorber system of claim 14 in which each said bed includes activated charcoal.

28. The dynamic adsorber system of claim 14 in which the contaminant is a noble gas.

29. The dynamic adsorber system of claim 14 in which the contaminant is radon.

30. The dynamic adsorber system of claim 14 in which said means for providing varies said second flow relative to the difference in absolute temperatures of the contaminated fluid and the clean fluid.

31. The dynamic adsorber system of claim 14 further including:
first means for sensing the temperature of the clean fluid;
second means for sensing the temperature of the contaminated fluid; and
said means for providing being responsive to said first and second means for sensing and increasing the second flow as the temperature of the clean fluid decreases relative to the temperture of the contaminated fluid, and decreasing the second flow as the temperature of the clean fluid increases relative to the temperature of the contaminated fluid.

32. The dynamic adsorber system of claim 14 in which said means for providing supplies the clean fluid at substantially its ambient temperature.

33. A dynamic adsorber system for removing a contaminant from fluid, comprising:
an adsorption bed;
means for feeding contaminated fluid to said bed and for issuing cleansed fluid;
means for providing, from a fluid source separate from the contaminated and cleansed fluid, clean fluid relatively free of the contaminant to said bed to flush it with the clean fluid and for issuing the fluid, said means for providing supplying the clean fluid at a greater flow than that of the contaminated fluid at least when the temperature of the clean fluid is lower than that of the contaminated fluid; and
control means for alternately connecting said means for feeding to said bed to remove the contaminant from the fluid and connecting said means for providing to said bed to regenerate that bed before it is reconnected to said means for feeding.

34. The dynamic adsorber system of claim 33 in which said means for providing supplies the clean fluid at substantially its ambient temperature.

35. A dynamic adsorber system for removing radon from air, comprising:
first and second adsorption beds each having a capacity for radon based substantially on the flow of contaminated air to be cleansed, the capacity being independent of the concentration of radon in the air;
means for feeding the contaminated air to one of said beds and for issuing cleansed air, said means for feeding including first feed fan means for driving the fluid to be cleansed through said first bed and second feed fan means for driving the fluid to be cleansed through said second bed;
means for providing clean air relatively free of the radon to the other of said beds to flush it with the clean air and for issuing contaminated air, said means for providing including first regenerating fan means for driving the clean fluid through said first bed and second regenerating fan means for driving the clean fluid through said second bed; and
control means for connecting said means for feeding alternately to said first and second beds to remove the radon from the air, and for connecting said means for providing to the bed not connected to said means for feeding to regenerate that bed before it is reconnected to said means for feeding, said control means including timer means for activating said first feed fan means and said second regenerating fan means during one time period and activating said second feed fan means and said first regenerating fan means during another time period to alternately cleanse with one said bed while regenerating the other said bed.

36. The dynamic adsorber system of claim 35 in which said first and second beds are each enclosed in a housing having a first plenum associated with said feed fan means and a second plenum associated with said regenerating fan means.

37. The dynamic adsorber system of claim 36 in which said first and second plenums develop pressure differentials opposite from each other, said pressure differentials reversing at the end of each time period when fan activation reverses.

38. The dynamic adsorber system of claim 37 in which said control means further includes opposing flapper valve means disposed in each said plenum and operated by changes in pressure, for alternately connecting said plenum to one of said means for feeding and said means for providing and disconnecting that plenum from the other as the pressure differentials reverse.

39. A dynamic adsorber system for removing radon from air, comprising:
first and second adsorption beds each having a capacity for radon based substantially on the flow of contaminated air to be cleansed, the capacity being independent of the concentration of radon in the air;
means for feeding the contaminated air to one of said beds and for issuing cleansed air;
means for providing clean air relatively free of the radon to the other of said beds to flush it with the clean air and for issuing contaminated air;
control means for connecting said means for feeding alternately to said first and second beds to remove the radon from the air, and for connecting said means for providing to the bed not connected to said means for feeding to regenerate that bed before it is reconnected to said means for feeding;
said control means including drive means for relocating said first and second beds relative to said means for feeding and said means for providing to alternately cleanse with and regenerate each bed; and said control means further including timer means for periodically activating said drive means.

40. The dynamic adsorber system of claim 39 in which said first and second beds are separate portions of a single rotatable structure.

* * * * *